United States Patent [19]

Hopfe et al.

[11] Patent Number: 4,569,220
[45] Date of Patent: Feb. 11, 1986

[54] FLOW PROVER WITH SEAL MONITOR

[75] Inventors: Helmut W. Hopfe; Hershel Roberson, both of Corpus Christi, Tex.

[73] Assignee: Smith Meter, Inc., Houston, Tex.

[21] Appl. No.: 641,452

[22] Filed: Aug. 16, 1984

[51] Int. Cl.[4] ............................................. G01F 25/00
[52] U.S. Cl. ............................................ 73/3; 73/744; 73/714
[58] Field of Search .................... 73/3, 744, 745, 746, 73/705, 736, 714, 716–722

[56] References Cited

U.S. PATENT DOCUMENTS

| | | | |
|---|---|---|---|
| 3,403,544 | 10/1968 | Francisco, Jr. | 73/3 |
| 3,429,291 | 2/1969 | Hoffman | 73/744 X |
| 3,580,045 | 5/1971 | Pfrehm | 73/3 |
| 3,638,475 | 2/1972 | Grove et al. | 73/3 |
| 3,738,153 | 6/1973 | Simmons | 73/3 |
| 4,152,922 | 5/1979 | Francisco, Jr. | 73/3 |
| 4,300,548 | 11/1981 | Jones | 73/705 X |
| 4,331,262 | 5/1982 | Snyder et al. | 73/3 X |
| 4,372,147 | 2/1983 | Waugh et al. | 73/3 |
| 4,475,377 | 10/1984 | Halpine | 73/3 |
| 4,491,085 | 1/1985 | Stringer | 73/3 X |
| 4,502,334 | 3/1985 | Gorgens et al. | 73/705 |

FOREIGN PATENT DOCUMENTS

| | | | |
|---|---|---|---|
| 2534821 | 2/1977 | Fed. Rep. of Germany | 73/744 |
| WO83/02825 | 8/1983 | PCT Int'l Appl. | 73/3 |
| 2088566 | 6/1982 | United Kingdom | 73/3 |

*Primary Examiner*—Jerry W. Myracle
*Assistant Examiner*—Tom Noland
*Attorney, Agent, or Firm*—Arnold, White & Durkee

[57] ABSTRACT

A flow prover with seal monitor includes a housing with a cylinder and a piston-like displacer sealingly conveyed along the cylinder by the fluid flow to be measured. The displacer includes at least one rod that extends telescopically through the housing. A pair of conduits may be arranged concentrically within the rod, one in communication with a volume between a pair of seals whose integrity is to be monitored and the other in communication with the fluid in the housing. The conduits each communicate as well with a pressure sensor located outside of the housing. The sensor may be mounted on the rod to sense the absence of a pressure differential between the conduits, which indicates a seal failure. The sensor may provide an indication, which may be detected at the end of a proving cycle, that the seal integrity was maintained throughout the proving cycle.

14 Claims, 4 Drawing Figures

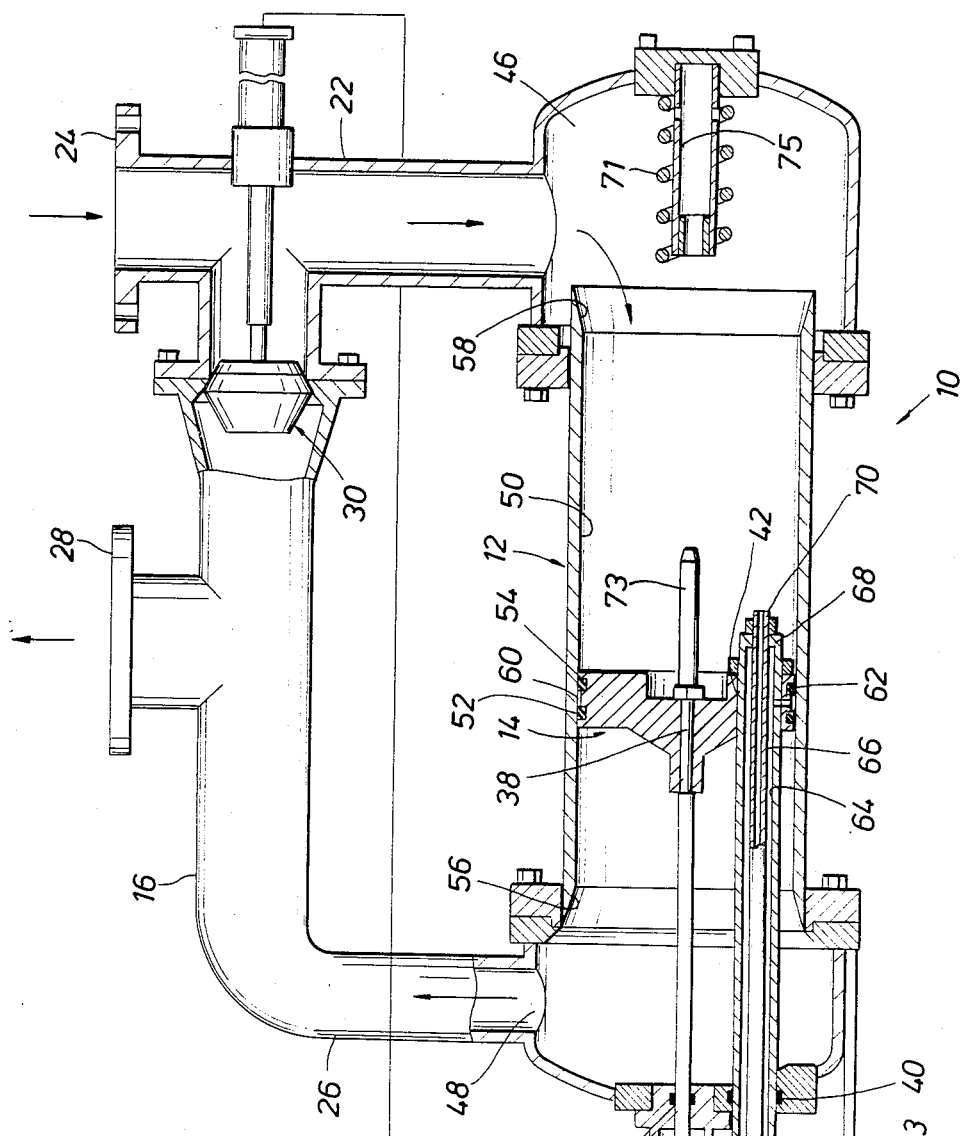
FIG. 1
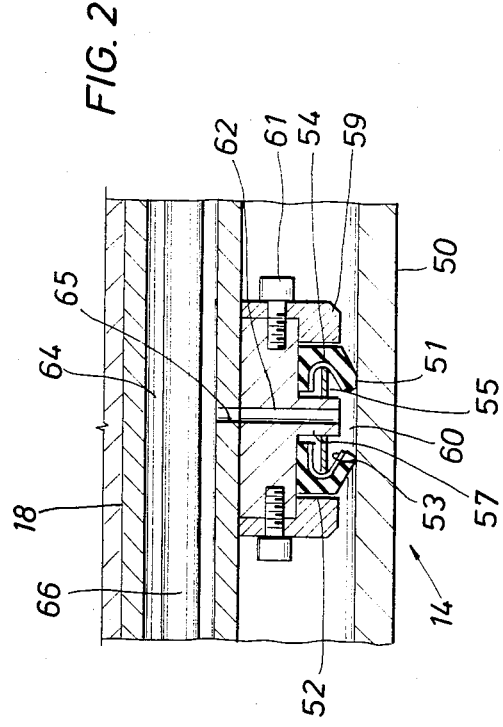
FIG. 2
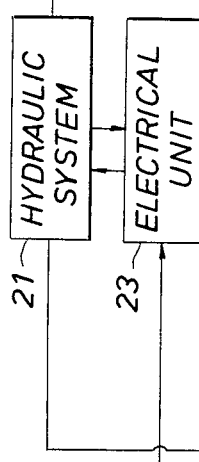

FLOW PROVER WITH SEAL MONITOR

BACKGROUND OF THE INVENTION

This invention pertains to the volumetric measurement of flow and, particularly, a flow prover useful in periodically calibrating a continuous flow meter in a pipeline without interrupting the flow of fluid. The flow prover of this invention falls generally into that class of flow provers characterized by the measurement of the movement of a piston travelling through a cylinder wherein the piston has a plurality of seals which form a fluid barrier in the annular space between the piston and the cylinder. This invention pertains specifically to a compact flow prover having means for monitoring the seal integrity.

U.S. Pat. No. 3,738,153 to Simmons discloses a seal monitor for a flow prover using resilient balls. A hydraulic cylinder, used to open and close passages for the balls, has a seal monitor that detects a pressure difference between the surrounding fluid and the fluid in the region between a passage and the cylinder piston head. However, in Simmons the piston head does not slide sealingly along a testing cylinder and therefore the seals can be monitored while the piston head is stationary.

A flow having means for monitoring the seal integrity of its piston is disclosed in U.S. Pat. No. 4,372,147 to Waugh. Waugh discloses a flow meter prover having a measuring conduit coaxially mounted within on outer housing which has fluid apertures adjacent the upstream and downstream ends of the measuring conduit, a piston mounted within the conduit, an actuating rod axially projecting from the downstream side of the piston with the free end of the rod extending through the downsteam end of the outer housing, and piston detection switches spaced along the length of the measuring conduit. The piston is provided with two seals each encircling the perimeter of the piston to form an annular cavity between the seals. A flexible tube, helically wrapped about the rod, has one end connected to a passage which is in fluid communication with the annular cavity, and the other end of the flexible tube is connected to the exterior of the apparatus. During the operation of the prover, fluid leakage past either of the seals causes fluid flow that can be detected by monitoring the pressure in the flexible tubing by means of the exterior connection to the flexible tubing.

It is believed that there are several disadvantages associated with devices of the type disclosed in Waugh. One potential disadvantage is that the flexible tubing is cycled with the reciprocating piston, and over a period of time this may ultimately lead to a failure of the flexible tube. Another potential disadvantage is that the differential pressure between the flexible tubing and the apparatus fluid may result in collapse or rupture of the tubing. Still another potential disadvantage is that a pressure source or a bleed system may be required. In either case, seal monitoring is complicated by the movement of the seals past the fluid apertures in the measuring conduit. When the integrity of the seals is monitored dynamically during a proving run, a control system to rapidly increase pressure or bleed the flexible tubing after it moves past the fluid apertures may be required so that a decrease or increase in pressure in the flexible tubing may be observed before the proving run is completed. Moreover, it is believed that during the pressuring or bleeding, fluid leakage past the seals may not be detected.

It is a feature of this invention to provide a flow prover having means for monitoring the seal integrity of the flow prover piston which overcomes many of the disadvantages associated with known devices.

SUMMARY OF THE INVENTION

The flow prover of this invention determines the rate of flow by measuring the time in which a displacer travelling through a cylinder displaces a known volume of fluid. The flow prover of this invention is provided with means for monitoring the seal integrity of the displacer.

The flow prover of this invention comprises a measuring cylinder and a displacer or piston movably disposed within the cylinder. The cylinder may be filled with a fluid whose flow rate is to be measured by the prover. The displacer, provided with two seals, forms a fluid barrier in the cylinder when it is disposed within the cylinder. The seals are mechanically compressible and the flow prover is operable to form an annular volume of pressurized fluid defined by the seals, the displacer and the cylinder. A first conduit is positioned parallel to the axis of the cylinder. One end of the conduit is attached to the displacer and the free end is accessible externally from the flow prover. The conduit has a coaxial channel of substantially uniform diameter which permits fluid communication between the ends of the conduit, and the channel is in fluid communication with the annular volume. The flow prover is provided with a second conduit which is located in the channel of the first conduit. The second conduit is in fluid communication with the fluid in the cylinder and is accessible from the free end of the first conduit. Means are also provided for measuring the differential pressure between the first and second conduits.

The flow rate can be determined by measuring the time in which the displacer displaces a predetermined volume of fluid. Any inaccurracy introduced by the leakage of the fluid past the displacer seals is easily detected. Since the annular volume between the seals is in fluid communication with the first conduit, its pressure can be monitored. Similarly, the pressure of the fluid in the cylinder is monitored by monitoring the pressure in the second conduit. If the seal integrity is maintained, the mechanical compression of the seals results in a higher fluid pressure in the annular volume than in the cylinder, and this pressure differential is maintained until the seals are decompressed. If the seal integrity is lost, fluid leakage past either of the seals causes a decrease in the pressure differential between the annular volume and the cylinder fluid.

BRIEF DESCRIPTION OF THE DRAWING

FIG. 1 is a partial, partially sectioned cross-sectional view of one embodiment of the compact flow prover of this invention;

FIG. 2 is an enlarged partial cross-sectional view showing the portion of FIG. 1 including displacer seals;

DESCRIPTION OF A PREFERRED EMBODIMENT

Figure 3:
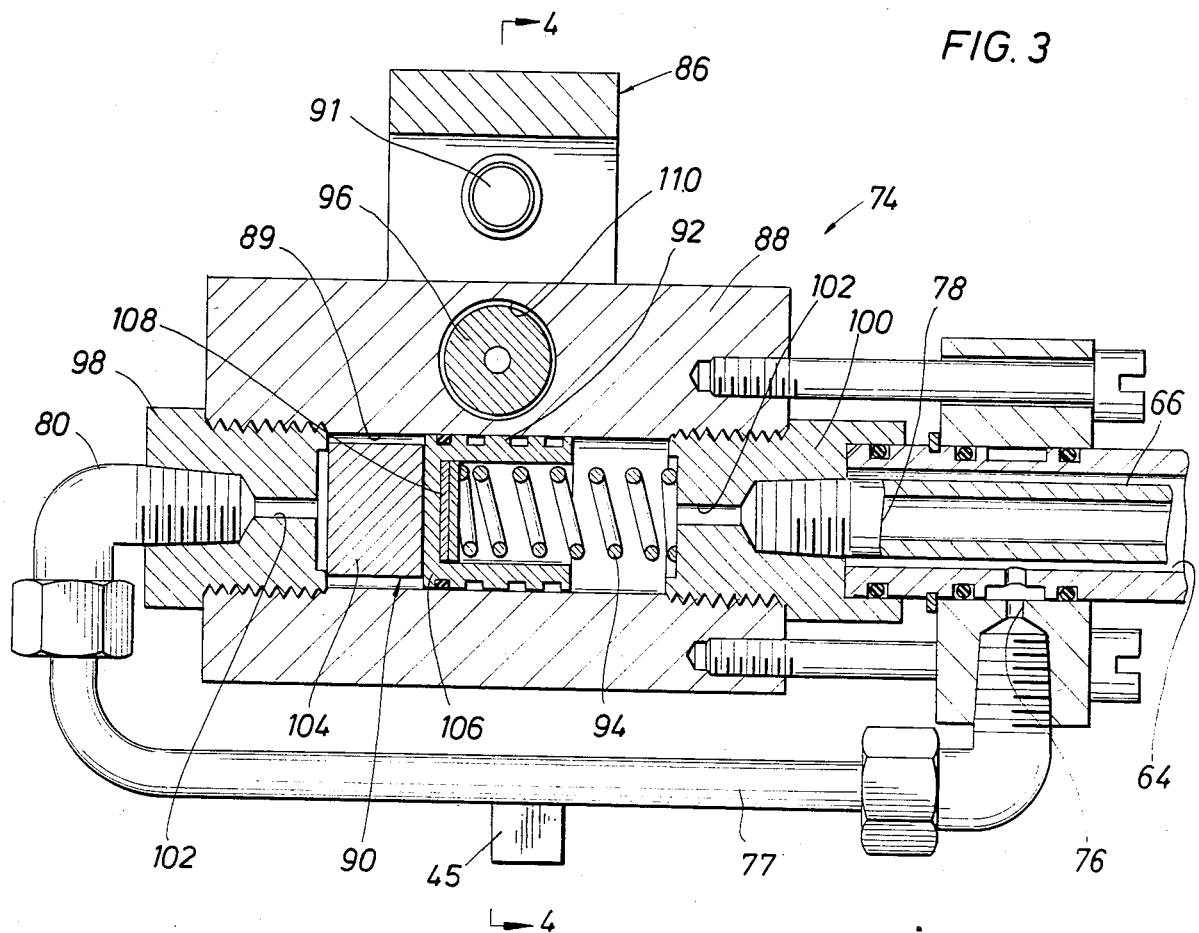
FIG. 3 is an enlarged cross-sectional view through the pressure sensor transverse to the plane of FIG. 1 with the detector rod telescoped inwardly into the prover housing to align with the detector.

Referring to the drawing wherein like reference characters are used for like parts throughout the several views, a flow prover 10, shown in FIG. 1, includes an displacer housing 12, a piston-like displacer 14, a bypass conduit 16, a relatively rigid detecting rod 18 and a reciprocal cylinder 20. The bypass conduit 16 includes an inlet leg 22 with an inlet 24, an outlet leg 26 with an outlet 28 and a normally closed bypass valve 30 between the legs 22 and 26. Liquid, from a pipeline or the like (not shown), may be inletted to the prover 10 through the inlet 24 and returned to the piping or other system through the outlet 28.

The cylinder 20 is conveniently a hydraulic cylinder with a reciprocal piston 32 having a piston rod 34 extending through a suitable seal 36 into the displacer housing 12. More specifically, an end 38 of the piston rod 34 is fixed to the displacer 14. Thus, when liquid is added or withdrawn from the cylinder 20 through the action of the hydraulic system 21, the piston 32 is displaced, resulting in a corresponding translation of the displacer 14. However the cylinder 20 and piston 32 may be replaced if desired with a pressure vessel and a hydraulic ram (not shown).

The detecting rod 18 also extends slidably through a seal 40 in the displacer housing 12 from an inner end 42, fixed to the displacer 14, to an outer end 44 positioned externally of the housing 12. Thus, reciprocation of the displacer 14 within the housing 12 results in telescoping movement of the rod 18 with respect to its seal 40. A position detector 43 is located along the length of the rod 18. The detector 43 may take a variety of conventional formats but is conveniently either an optical or magnetic position detecting means whereby a flag or other indicator 45 positioned along the rod 18 is sensed by appropriate detector elements 47 positioned along a rod 49 adjacent the rod 18. In this way the position of the rod 18 with respect to the housing 12 may be determined at the electrical unit 23, which may include a computer and an electronic timer, and more specifically the position of the displacer 14 with respect to the housing 12 may be monitored.

The displacer housing 12 includes a pair of enlarged chambers 46, 48 on either end of a cylinder 50. The chamber 48 communicates with the outlet leg 26 while the chamber 46 communicates with the inlet leg 22. The chambers 46, 48 are of sufficient internal size to permit the fluid to flow around the displacer 14, without obstruction, when the displacer 14 is positioned in either chamber 46 or 48. The displacer 14 is provided with peripheral, resilient annular seals 52 and 54 which are compressed when the displacer 14 is positioned within the cylinder 50, as shown in FIG. 1. This compression may be achieved by chamfers 56 and 58 on either end of the cylinder 50 adjacent the respective chambers 48 and 46. With the seals 52 and 54 in engagement with the cylinder 50, an annular volume 60 is defined between the seals 52, 54, the displacer 14, and the cylinder 50. This volume 60 communicates by way of a radially oriented passageway 62 with the interior of the rod 18.

As shown in FIG. 2, the seals 52 and 54 may be U-shaped with inwardly facing prongs 51 arranged to be deflected by the inner surface of cylinder 50. A U-shaped metallic spring member 53 is sandwiched within each seal 52, 54 by an annular band 55 that is in turn sandwiched by the displacer post 57. The seals 52 and 54 are removeably located by guides 59 held on the displacer 14 by screws 61.

The displacer 14 is urged into the cylinder 50 by the coil spring 71 that encircles a flexible, apertured bearing sleeve 75 in the chamber 46. The sleeve 75 is shaped to receive the tapered, forwardly jutting pilot 73 and thus to guide or axially align the rod 34 in the chamber 46.

The operation of the displacer 14 and its components is explained in greater detail in U.S. patent application Ser. No. 546,568, filed Oct. 28, 1983, in the name of C. D. Erickson, and in a commonly assigned continuation-in-part application, titled "A Compact Flow Prover", Ser. No. 641,029, filed Aug. 15, 1984, and to be Pat. No. 4,549,426 in the name of C. D. Erickson, both of which are hereby expressly incorporated by reference herein. While the present invention has been described with respect to a particular arrangement of displacer 14, displacer housing 12, and bypass conduit 16, those skilled in the art will appreciate that the principles of the present invention may be applied to a variety of flow prover arrangements including that disclosed herein.

The rod 18 includes a relatively rigid first conduit 64 defined within its interior and a relatively rigid second conduit 66 held concentrically within the first conduit 64. The first conduit 64 is defined by the interior walls of the rod 18, the exterior walls of the second conduit 66 and by end seals 68 at each end of the rod 18. While the first conduit 64 is sealed on each end, the second conduit 66 is open on its inwardmost end 70 to communicate with the interior of the displacer housing 12, and conveniently to communicate with the upstream side of the displacer 14. The first conduit 64 communicates via a passage 65 at an intermediate point along its length with the passageway 62 which in turn communicates with the volume 60. The external end 72 of the second conduit 66 communicates with a pressure sensor 74, mounted on the rod 18, while the external end portion 79 of the first conduit 64 communicates with a passageway 76 that communicates with the transducer 74 by way of a tube 77. Referring to FIG. 3, the transducer 74 is advantageously a differential pressure sensor with a low pressure port 78 in fluid communication with the second conduit 66 and a high pressure port 80 in fluid communication with the first conduit 64.

Figure 4:
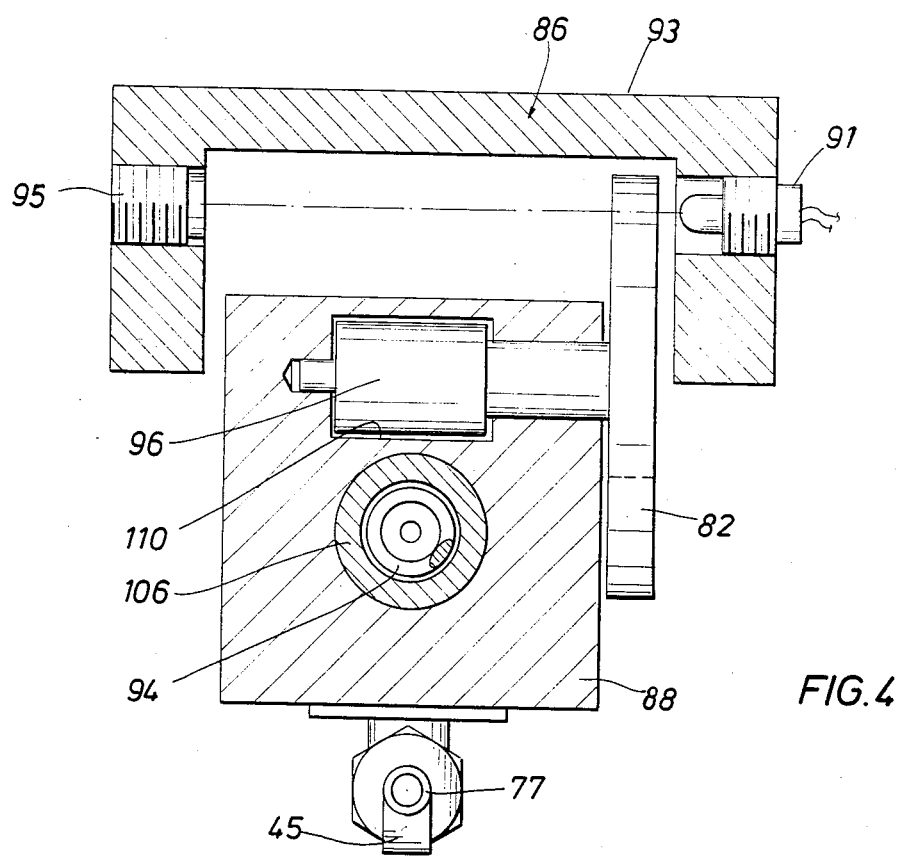
FIG. 4 is a cross-sectional view taken generally along the line 4—4 in FIG. 3.

The sensor 74 may include an externally mounted, broadly circular, rotary indicator 82 with a pie-shaped notch 84 cut from it. A position sensor 86, shown in FIGS. 1, 3 and 4, is mounted on the cylinder 20, oriented in alignment with the position of the sensor 74 at the completion of the proving cycle to detect the rotary position of the indicator 82. The sensor 86 may take a variety of forms including that of an optical or magnetic position sensor or a linear transducer. When an optical system is used, as in the illustrated embodiment, an opposed light source 91 and receiver 95 may be provided within a U-shaped housing 93 which straddles the indicator 82, as shown in FIG. 4. Alternatively, the sensor 74 may be adapted to provide a continuous electrical signal which is proportional to the sensed differential pressure.

As shown in FIG. 3, the sensor 74 includes a tubular body 88 with an axial bore 89, a magnetic piston 90, a piston seal 92, a range spring 94, and a cylindrical rotary magnet 96. The ends of the bore 89 receive threaded fittings 98 and 100 with reduced passageways 102. The magnetic piston 90 includes a magnet 104 and a cup-shaped piston element 106 shaped to slide along the bore 89. The spring 94 is maintained within the interior of the element 106 between a pair of stacking spacers 108 and the fitting 100. As the magnet 104 is displaced along the bore 89, due to a pressure differential between the ports 78 and 80, the rotary magnet 96, held within a transverse bore 110 is rotated. This rotation results in rotation of the indicator 82 approximately 180° into the position shown in FIG. 1.

The sensor 74 may be made by modifying the piston type sensor available from Orange Research, Inc., Milford, Conn. It can be readily appreciated, however, that other types of differential pressure sensors, such as rolling diaphragm sensors or convoluted diaphragm sensors, also available from Orange Research, Inc., may be used as well.

The compact flow prover 10 may be operated by allowing a fluid, whose flow rate is to be measured, to flow through the prover 10 such that the displacer 14 travels between two predetermined positions in the cylinder 50 while the amount of time which is required to traverse this distance is determined at the electrical unit 23. Specifically, fluid inletted through the port 24 encourages the movement of the displacer 14 from the chamber 46 to the chamber 48 from right to left in FIG. 1. This causes the rod 18 to telescope further out of the housing 12. The position detector elements 47 located along the length of the rod 18 detect the initial and final positions of the rod 18 and these indications may be used to control an electronic counter (not shown) included within the electrical unit 23. Based on the time required for the displacer 14 to move a given distance, the flow rate may be calculated.

The normally closed poppet valve 30 and cylinder 20 are useful in switching the prover 10 between measuring and retracting modes. Specifically, with the valve 30 in its open position, fluid under pressure may be supplied to the cylinder 20, to return the displacer 14 from the chamber 48 back to the chamber 46. The positions of the piston 32 and the valve 30 may be controlled by the hydraulic system 21.

The displacer seals 52 and 54 are compressed by the chamfers 56 and 58 of the cylinder 50 as the displacer 14 moves into the cylinder 50. If the integrity of the seals 52 and 54 is inviolate, the pressure in the volume 60 increases as the seals 52, 54 are compressed. Because the annular volume 60 is in fluid communication with the high pressure port 80 of the sensor 74, the magnetic piston 90 moves to compress the range spring 94. This movement of the piston 90 rotates the magnet 96 and the indicator 82. The motion of the indicator 82 is then detected by the position sensor 86 to indicate that the seals 52, 54 are working. When the displacer 14 is located in either chamber 46 or 48, or when there is a seal leak, the differential pressure is zero and the indicator 82 is not displaced. When the pressure difference is equalized the spring 94 returns the piston 90 to its initial position. With the notch 84 positioned upwardly, the light from the source 91 is detected by the receiver 93.

For optimum reliability, the position sensor 86 is arranged to detect the rotary indicator 82 in a position which corresponds to the completion of the proving cycle, as shown in FIG. 1. In this manner, any seal failure through the entire proving cycle is indicated by the failure of the position sensor 86 to detect the presence of the rotary indicator 82 at the point of insertion of the rod 18 corresponding to the completion of the proving cycle. In some applications, however, the reliability of this implementation may need to be greater. In these applications, the indicator 82 and sensor 86 may be replaced with a continuous indicator which provides a continuous electrical output indicative of seal integrity. This may be accomplished in a variety of ways such as by mounting the position sensor 86 on board the rod 18 or the pressure sensor 74.

In the static method of determining seal integrity the displacer 14 is positioned within the cylinder 50 with the bypass valve 30 open. The pressure in the annular space 60 may then be observed for a longer period of time. This may be useful since the duration of the proving cycle may be less than $\frac{1}{3}$ of a second.

While in the illustrated embodiment, pressure on the downstream side of the displacer 14 is compared to pressure between the seals 52 and 54, it is also feasible to measure the pressure on the upstream side. Although the concentric arrangement of the conduits 64 and 66 is advantageous, it is also possible to use a pair of separate, parallel conduits. In addition, although a rotary indicator 82 is believed to be advantageous, a variety of other indicators 82 and position sensing systems may be utilized.

The seal integrity monitoring means of the present invention has many advantages. The seal monitoring means may have few moving parts. The conduits 64, 66 may be made from a rigid material which is not subject to collapse or failure. By placing the differential pressure measuring means directly on the free end of the conduits, the seal monitoring means may be made entirely self-contained. Then, the seal monitoring means may move with the seals being monitored. At the same time the differential pressure measuring means are accessible externally from the compact flow prover and may easily be maintained without disassembling the flow prover or removing the displacer. Since the seal monitoring means may be entirely self-contained, no double block-and-bleeding system on external pressurizing source is required.

While we have described the above specific implementations of our invention, many other variations will occur to those skilled in the art. It is intended that all such variations that would fall within the true spirit and scope of the appended claims to be embraced thereby.

What is claimed is:

1. A flow prover comprising:
   a measuring cylinder having a substantially uniform inside diameter, said cylinder operable to be filled with a fluid whose flow rate is to be measured by said prover;
   a displacer movably disposable within said cylinder, said displacer having first and second seal means for forming a fluid barrier in said cylinder, said seal means being compressible to form an annular volume of pressurized fluid defined by said seal means, said displacer, and said cylinder;
   a first conduit having a first end attached to said displacer and in fluid communication with said annular volume and a second end accessible externally of said cylinder;
   a second conduit having a first end attached to said displacer and in fluid communication with said fluid in said cylinder and a second end accessible externally of said cylinder; and
   means located externally of said cylinder for measuring the differential pressure between said second ends of said first and second conduits, one of said conduits being positioned concentrically within the other, and said differential pressure measuring means being mounted on said conduits.

2. The flow prover of 1 wherein said differential pressure measuring means includes a magnetic piston and a housing, said piston being displaceable within said housing, said housing including a magnet displaceable by the motion of said piston within said housing, said magnet having an indicator portion external of said housing, said differential pressure measuring means further including position sensing means for detecting the displacement of said indicator portion.

3. The flow prover of claim 2 wherein said position sensing means is arranged to be actuated at an end of a path of inward movement of said displacer within said cylinder.

4. The flow prover of claim 2 wherein said indicator portion is a disc with a cut-out region.

5. The flow prover of claim 4 wherein said position sensing means includes an optical position sensor.

6. The flow prover of claim 1 including means external to said cylinder for detecting the position of said displacer by detecting the position of the first and second conduits.

7. The flow prover of claim 1 wherein said measuring means includes a differential pressure sensor.

8. The flow prover of claim 1 wherein the outer of said conduits is rigid, said cylinder including seal means for sealing the point of egress of said outer conduit from said cylinder.

9. The flow prover of claim 1 wherein said conduits are relatively rigid and are arranged to sealingly telescope through said cylinder.

10. A flow prover comprising:
a measuring cylinder having a substantially uniform inside diameter, said cylinder operable to be filled with a fluid whose flow rate is to be measured by said prover;
a displacer reciprocatably disposable within said cylinder, said displacer having first and second seal means for forming a fluid barrier in said cylinder, said seal means being compressible to form an annular volume of pressurized fluid defined by said seal means, said displacer, and said cylinder;
a first conduit having a first end attached to said displacer and in fluid communication with said annular volume and a second end accessible externally of said cylinder;
a second conduit having a first end attached to said displacer and in fluid communication with said fluid in said cylinder and a second end accessible externally of said cylinder;
means located externally of said cylinder for sensing the differential pressure between said second ends of said first and second conduits, said differential pressure sensing means including an indicator portion positioned externally of said housing and adapted to be displaced in response to differential pressure sensed by said differential pressure sensing means;
position sensing means for detecting the displacement of said indicator portion, said differential pressure sensing means being connected to said displacer for reciprocation with said displacer, said position sensing means being stationary such that the differential pressure indicated by said indicator portion may be detected by said position sensing means when said indicator portion is in alignment with said position sensing means.

11. The flow prover of claim 10 wherein said differential pressure sensing means includes a magnetic piston and a housing, said piston being displaceable within said housing, said housing including a magnet displaceable by the motion of said piston within said housing, said indicator portion being connected to said magnet.

12. The flow prover of claim 11 wherein said indicator portion is a disk with a cutout region.

13. The flow prover of claim 12 wherein said position sensing means includes an optical position sensor.

14. The flow prover of claim 13 wherein said disk is rotatable.

* * * * *